United States Patent [19]
Schauer

[11] Patent Number: 5,816,123
[45] Date of Patent: Oct. 6, 1998

[54] ATTACHMENT FOR A LATHE

[76] Inventor: Mathias P. Schauer, 1770 Mariposa, Las Cruces, N. Mex. 88001

[21] Appl. No.: 720,632

[22] Filed: Oct. 2, 1996

[51] Int. Cl.[6] ........................................... B23B 5/08
[52] U.S. Cl. .................. 82/17; 82/70.1; 82/118; 82/133
[58] Field of Search .............................. 82/17, 118, 133, 82/123, 132, 70.1, 152, 154, 905

[56] References Cited

U.S. PATENT DOCUMENTS

| | | | |
|---|---|---|---|
| 2,736,222 | 2/1956 | Campbell | 82/17 X |
| 2,782,668 | 2/1957 | Richet | 82/17 X |
| 3,128,657 | 4/1964 | Hebert | 82/133 X |
| 3,865,010 | 2/1975 | Hodgson | 82/133 X |
| 4,148,235 | 4/1979 | Gerth | 82/132 |
| 4,611,644 | 9/1986 | Larson . | |
| 4,694,713 | 9/1987 | Snyder et al. . | |
| 5,085,109 | 2/1992 | Hidehiko et al. | 82/118 |
| 5,139,060 | 8/1992 | Sliker . | |

Primary Examiner—A. L. Pitts
Assistant Examiner—Henry W. H. Tsai
Attorney, Agent, or Firm—Richard C. Littman

[57] ABSTRACT

A machine tool which is a template tracing attachment which significantly reduces the slack or hysteresis in the operation of a machinist's lathe. Optical or magnetic scales and respective sensors assist in the accuracy of producing workpieces from a template. The accurate reproduction of a workpiece can be manual or computer assisted. The attachment can be retrofitted or included in the production of a lathe.

20 Claims, 1 Drawing Sheet

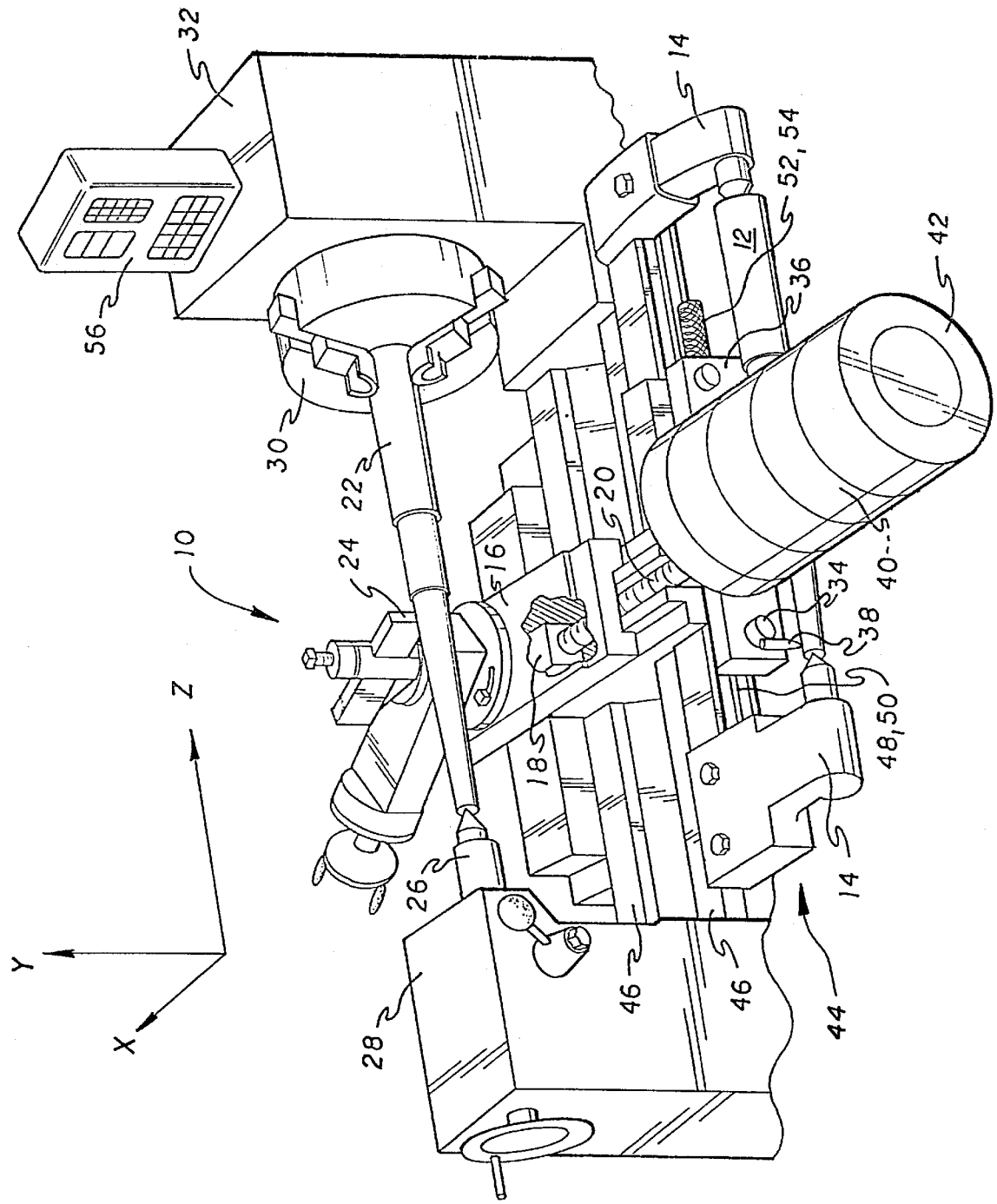

ATTACHMENT FOR A LATHE

BACKGROUND OF THE INVENTION

1. Field of the Invention

The present invention relates to a machine tool and, more particularly, to a template tracing attachment for a machinist's lathe. The template tracing attachment of the present invention includes a cross slide containing a ball screw and nut assembly to reduce slack for accurate reproduction of a workpiece. The improvement in the accurate reproduction of a workpiece can be manual or computer assisted.

2. Description of the Prior Art

Tracing attachments conventionally referred to as tracers are currently retrofitted, hydraulically powered and have their own dovetail slide unit with a cutting tool held by a block that is mounted to a machinist's lathe. The retrofitted slide and tool block are powered by a motorized pump and hydraulic tank. A tracer valve with a stylus travels along a template causing the slide with the cutting tool to duplicate the shape of the template. However, the tracing operation, being purely mechanical, inherently contains a troublesome slack problem, and fails to faithfully duplicate the template's pattern or form resulting in increased costs in labor and materials.

U.S. Pat. No. 4,611,644 issued on Sep. 16, 1986, to Robert W. Larson describes a combination manual and automatic tracer lathe for cutting a wooden work piece. The pattern can be computer or mechanically generated with a pattern model. With either method, the cutter is moved back and forth longitudinally along the work piece as successfully deeper or new cuts are made in the work piece according to the model. In FIG. 3 of the Larson patent, the split nut assembly 70 surrounding the threaded rod 60 moves the cutting base 90 and cutter 20 by operation of the computer motor 62. A hand held control unit or a table mounted control unit can be used with a programmable computer. A manually operated stepper motor 80 moves the tracer head 88 to contact the pattern model 130. The wood chips are gathered by vacuum. The description of the structural elements of the computerized lathe is incorporated herein by reference. However, there is no suggestion in Larson that a different bearing-containing nut would be more effective in resolving the problem of slack during the cutting operation.

U.S. Pat. No. 4,694,713 issued on Sep. 22, 1987, to Steven A. Snyder et al. describes a duplicating system for a wood lathe. The invention is based on the improvement of relocating the position of the pattern holding assembly which holds a template or model above the rotational axis of the workpiece, thereby increasing the clearance between the workpiece and the table. This teaching is directly opposed to the present invention wherein the workpiece is positioned above and in front of the template.

U.S. Pat. No. 5,139,060 issued on Aug. 18, 1992, to James A. Sliker describes a duplication attachment for a wood turning lathe. The duplicator attachment permits the pattern to be supported on the same vertical center as the workpiece and above the workpiece rather than below or to the side of the workpiece. Therefore, this teaching is diametrically opposed to the relationship of the workpiece and the pattern in the present invention.

These patents do not recognize the problem of slack in the duplication of a pattern which the present invention solves with a minimum of modification of the cross slide and the use of optical or magnetic scales and sensors.

None of the above inventions and patents, taken either singly or in combination, is seen to describe the instant invention as claimed.

SUMMARY OF THE INVENTION

Accordingly, it is a principal object of the invention to provide a tracer attachment for a lathe.

It is another object of the invention to provide a ball screw and nut within the existing cross slide having a cutting tool.

It is a further object of the invention to provide a first encoder and electric motor to operate the ball screw.

Still another object of the invention is to provide a second encoder coupled to a stylus which contacts the template surface.

A final object of the invention is to provide a computer which correlates the signals received by the second encoder to manipulate the first encoder and the electric motor to move the ball screw and the cutting tool with a minimum of slack to accurately reproduce the template shape on the workpiece.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawing.

BRIEF DESCRIPTION OF THE DRAWING

The sole FIGURE is a rear perspective view of the invention on a lathe with a partial breakaway of the cross slide to expose the ball nut on the ball nut screw.

DETAILED DESCRIPTION OF THE PREFERRED EMBODIMENTS

The present invention provides a template tracing attachment as a first embodiment which is conventionally computerized to effectively duplicate the pattern of a model on a lathe. This electro-mechanical device can be retrofitted to an existing lathe or can be included in the manufacture of a lathe.

The drawing is viewed from the rear in order to best illustrate the features of the template tracing attachment, i.e., the lathe operator normally stands in front of a conventional metal working lathe 10, but can move around the lathe to observe the overall operation of the lathe. An x, y, z coordinate axis diagram has been inserted in the drawing to indicate the directions of various lathe parts. A model or template 12 is installed between the model or template holders 14. A cross slide 16 has its conventional screw and nut assembly replaced with the ball screw nut 18 assembled on a ball screw 20, with appropriate adapters and connecting hardware (not shown). The designed ball screw 20 rotates inside the nut 18 which has recirculating ball bearings (not shown) to result in the elimination or a great reduction of the slack encountered normally between a screw and a nut in a conventional cross slide. The workpiece 22 is shown being cut by a cutter 24 as a replica of the template 12 and held by the center element 26 of the tailstock 28 and at the opposite end by a work holding device 30 on the headstock 32.

The use of encoders are essential to the present invention. Encoders are devices, as applied to a lathe, that both monitor and dictate the speed, direction and number of rotations of a motor shaft.

The computerized operation is effected by a first encoder device 34 mounted on a bracket 36 which also holds the stylus 38. The signals sent by the stylus 38 tracing the pattern or form of a template by motions along the y-axis are transmitted from the first tracer encoder device 34 to a computer (not shown), recorded and transmitted to the second encoder device 40, located within or in the proximity of the stepper or servomotor 42, which directs the motion of the cutter 24 in or out (x-axis) and horizontally (z-axis) along the length of the workpiece 22. A control panel 56 which has a digital readout of the various recorded parameters is conveniently mounted on the headstock 32.

The cutter 24 is mounted on the cross slide 16. The position of the cutter 24 on the workpiece 22 can also be set manually at the midpoint or center for the type of workpiece illustrated. The cross slide is moved in and out along the x-axis by the action of ball screw 20 being rotated within the stationary ball screw nut 18 by servomotor 42. Motor 42 is mounted on the bracket 36 attached to the carriage or saddle 44 which supports the cross slide 16. Carriage 44 moves along the z-axis on the two rails 46 joining the headstock 32 and the tailstock 28. The movement of the carriage 44 can be controlled manually or preferably by the computer as explained below with reference to the second embodiment regarding z-axis scales and sensors.

The prior art problem has been the slack or hysteresis involved in the critical movement of the cutter in or out, under either manual or computer control, because the conventional screw and nut assembly in the cross slide 16 manifests a slack of 0.001 to 0.002 inch even when the lathe is new. Of course, over time due to wear, the slack becomes greater, resulting in inaccurate reproduction of a pattern and increased costs in manufacture.

By utilizing the present invention by retrofitting a problematic lathe with the present invention, the unexpected result has been a slack tolerance of 0.0001 inch or at least a 10 fold decrease in the slack or hysteresis characteristic. This result applies to both the mechanical operation and the computerized operation of metal working lathes. Therefore, machinist shops can reap the benefit by modifying only a small part of their expensive metal lathe machinery by incorporating the ball screw and nut assembly in their invested machinery instead of incurring the high cost of purchasing new lathes.

Another advantage made possible by the present invention, is the elimination of a ponderous piece of equipment presently required for lathes. A hydraulic pump system containing an electric motor, a pump and a hydraulic fluid reservoir is required next to the lathe and the lathe operator to provide the driving force for moving parts of the metal lathe. This piece of equipment is no longer required.

A second embodiment is the addition of either an optical position scale element 48 or a magnetic position scale element 50 attached along the z-axis of the lathe 10, i.e., the longitudinal direction of the cutter 24, to monitor the location of the carriage or saddle 44 and the position of the cutter 24 on the workpiece 22. These position scale elements 48 and 50 provide feedback and coordination between the z-axis scale and the first encoder device 34 to store and recall traced shapes or to be programmed independently of the second encoder device 40. The optical position scale 48 is a visual scale communicating visual signals which are detected by the optical position sensor 52. The magnetic position scale sensor 54 indicates the carriage's position by detecting the magnetic position scale's indication of the location of the carriage 44 and sending the detected impulses to the computer for recording of the carriage's position. The displays of these position scale elements 48 and 50 can be conveniently located in a separate console.

Once the template's configuration or pattern has been programmed in the computer by the encoder tracer devices 34 and 40, duplicate workpieces 22 can be manufactured automatically with precision and minimal control by the lathe operator.

Some exemplary dimensions or parameters of the apparatus utilized are as follows: ball screw 20, 0.75 to 1.25 in. in diameter, thread pitch ratio, 1:10; ball screw nut 18, 1 to 1.5 in. square, 2 in. length; and the ball screw turning motor, ⅛ HP to develop 50 in-lb. torque. It is noted that the ball screw and the ball screw nut are sized to fit the existing cross slide for retrofitting.

The present invention enables anyone desiring to upgrade an aging lathe to do so by replacing the existing screw and nut assembly with the innovative ball screw and ball screw nut assembly. In addition, the present invention can be readily incorporated with the manufacture of new lathes.

It is to be understood that the present invention is not limited to the sole embodiment described above, but encompasses any and all embodiments within the scope of the following claims.

I claim:

1. A template tracing attachment assembly for a machinist's lathe comprising:

a cross slide containing a ball screw for cooperating with a ball screw nut fixed in said cross slide;

a motor means for driving the ball screw;

a first tracer encoder device and stylus assembly proximate to a template;

a second encoder device located inside the motor means; and a computer system connected for receiving parameter signals transmitted from the first tracer encoder device, recording said parameter signals and transmitting said parameter signals to said second encoder device to drive said ball screw and said cross slide to a position whereby a lathe cutter can duplicate a configuration of a template in an x-direction.

2. The template tracing attachment assembly according to claim 1, wherein the ball screw nut has recirculating ball bearings within for cooperation with the ball screw, whereby slack in the x-direction is substantially eliminated.

3. The template tracing attachment assembly according to claim 2, wherein said ball screw and said ball screw nut with the recirculating ball bearings are retrofitted to the machinist's lathe.

4. The template tracing attachment assembly according to claim 1, wherein the motor means is a stepper motor.

5. The template tracing attachment assembly according to claim 1, wherein the motor means is a servomotor.

6. The template tracing attachment assembly according to claim 1, wherein a scale element is positioned parallel to the template between holders of the template, whereby a lathe operator can visually view linear measurements involved for various portions of the template.

7. The template tracing attachment assembly according to claim 6, wherein the scale element is selected from an optical scale element and a magnetic scale element.

8. The template tracing attachment assembly according to claim 7, wherein the scale element is an optical scale element which is read by a stationary sensor proximate to the optical scale.

9. The template tracing attachment assembly according to claim 7, wherein the scale element is a magnetic scale element which is read by a stationary magnetic sensor proximate to the magnetic scale element.

10. The template tracing attachment assembly according to claim 7, wherein the scale element is observed from a sensor with both the scale element and the sensor positioned on a separate console.

11. A template tracing attachment assembly for a lathe comprising:

a cross slide containing a retrofitted ball screw for cooperating with a ball screw nut fixed in said cross slide;

wherein the ball screw nut has recirculating ball bearings within for cooperation with the ball screw, whereby slack in the x-direction is substantially eliminated;

a motor means for driving the ball screw;

a carriage for supporting said cross slide and a cutter;

a first tracer encoder device and stylus assembly proximate to a template;

a second encoder device located inside a tracer motor;

a scale element positioned parallel to the template between holders of the template, whereby a lathe operator can visually view linear measurements involved in the movement of the carriage for various portions of the template; and a computer system connected for receiving parameter signals transmitted from the first tracer encoder device, recording said parameter signals and transmitting said parameter signals to said second encoder device to drive said ball screw and said cross slide to a position whereby the lathe cutter can duplicate the configuration of the template in an x-direction.

12. The template tracing attachment assembly according to claim 11, wherein the scale element is selected from an optical scale element and a magnetic scale element.

13. The template tracing attachment assembly according to claim 12, wherein the scale element is an optical scale element which is read by a stationary sensor proximate to the optical scale.

14. The template tracing attachment assembly according to claim 12, wherein the scale element is a magnetic scale element which is read by a stationary magnetic sensor proximate to the magnetic scale element.

15. The template tracing attachment assembly according to claim 12, wherein the scale element can be observed from a sensor with both scale element and sensor being positioned on a separate console.

16. A template tracing attachment assembly for a machinist's lathe comprising:

a cross slide;

a servomotor for driving said cross slide;

a carriage for supporting said cross slide and a cutter;

a first tracer encoder device and stylus assembly proximate to a template;

a second encoder device located inside a tracer servomotor;

a scale element positioned parallel to the template between holders of the template, whereby a lathe operator can visually view linear measurements involved in the movement of the carriage for various portions of the template; and a computer system connected for receiving parameter signals transmitted from the first tracer encoder device, recording said parameter signals and transmitting said parameter signals to said second encoder device to drive said cross slide to a position whereby the lathe cutter can duplicate the configuration of the template in an x-direction.

17. The template tracing attachment assembly according to claim 16, wherein the scale element is selected from an optical scale element and a magnetic scale element.

18. The template tracing attachment assembly according to claim 17, wherein the scale element is an optical scale element which is read by a stationary sensor proximate to the optical scale.

19. The template tracing attachment assembly according to claim 17, wherein the scale element is a magnetic scale element which is read by a stationary magnetic sensor proximate to the magnetic scale element.

20. The template tracing attachment assembly according to claim 17, wherein the scale element can be observed from a sensor with both scale element and sensor being positioned on a separate console.

* * * * *